United States Patent [19]
McClelland et al.

[11] Patent Number: 5,283,572
[45] Date of Patent: Feb. 1, 1994

[54] UTILITY METER INTERFACE CIRCUIT

[75] Inventors: Joseph H. McClelland, Mars, Pa.; Eric A. Berns, El Paso, Tex.

[73] Assignee: Communications Instruments, Inc., Chicago, Ill.

[21] Appl. No.: 569,178

[22] Filed: Aug. 17, 1990

[51] Int. Cl.⁵ ............................................. H04Q 1/00
[52] U.S. Cl. ........................ 340/870.02; 340/310 A; 361/196
[58] Field of Search ........ 340/870.02, 310 A, 870.03, 340/825.54, 825.66, 310 R; 379/107; 361/196, 178; 307/268, 272.1, 273, 289, 314; 364/483

[56] References Cited
U.S. PATENT DOCUMENTS

| | | | |
|---|---|---|---|
| 1,564,815 | 12/1925 | Ballance et al. | 307/141 |
| 2,403,890 | 7/1946 | Johnson | 340/870.03 |
| 3,320,440 | 5/1967 | Reed | 307/247.1 |
| 3,457,464 | 7/1969 | Wallentowitz | 361/198 |
| 3,470,538 | 9/1969 | Harbaugh | 364/200 |
| 3,676,875 | 7/1972 | Adams et al. | 340/870.03 |
| 3,697,970 | 10/1972 | Jaxheimer | 340/870.03 |
| 3,820,073 | 6/1974 | Vercellotti et al. | 340/870.03 |
| 3,851,184 | 11/1974 | Ukai et al. | 307/141 |
| 3,914,663 | 10/1975 | Johnson | 361/198 |
| 4,035,772 | 7/1977 | Abe et al. | 340/870.03 |
| 4,106,007 | 8/1978 | Johnston et al. | 340/310 A |
| 4,132,981 | 1/1979 | White | 340/870.02 |
| 4,276,631 | 6/1981 | Fujita et al. | 368/89 |
| 4,298,901 | 11/1981 | Weintraub et al. | 361/178 |
| 4,337,466 | 6/1982 | Spahn | 340/870.09 |
| 4,357,601 | 11/1982 | McWilliams | 340/506 |
| 4,811,011 | 3/1989 | Sollinger | 340/870.02 |
| 4,833,618 | 5/1989 | Verma et al. | 364/483 |

OTHER PUBLICATIONS

Emetcon Automated Distribution System—Communications Guide dated Sep., 1989.
Emetcon Automated Distribution System (color brochure)—May, 1988.

Primary Examiner—Donald J. Yusko
Assistant Examiner—Brian Zimmerman
Attorney, Agent, or Firm—Richards, Medlock & Andrews

[57] ABSTRACT

An interface to facilitate storing in an electric utility meter transponder, water usage data so that when remotely interrogated, access can be had to both electric and water usage data. A pulse indicative of water usage sets a magnetic latching relay in the interface circuit which causes a transponder supply voltage to be switched to two interface circuit timers. The first timer generates a first delay, after which the electric meter transponder is pulsed to register water usage. After a second, longer delay, the second timer resets the magnetic latching relay to thereby place the interface circuit in condition for receiving another water usage signal.

22 Claims, 3 Drawing Sheets

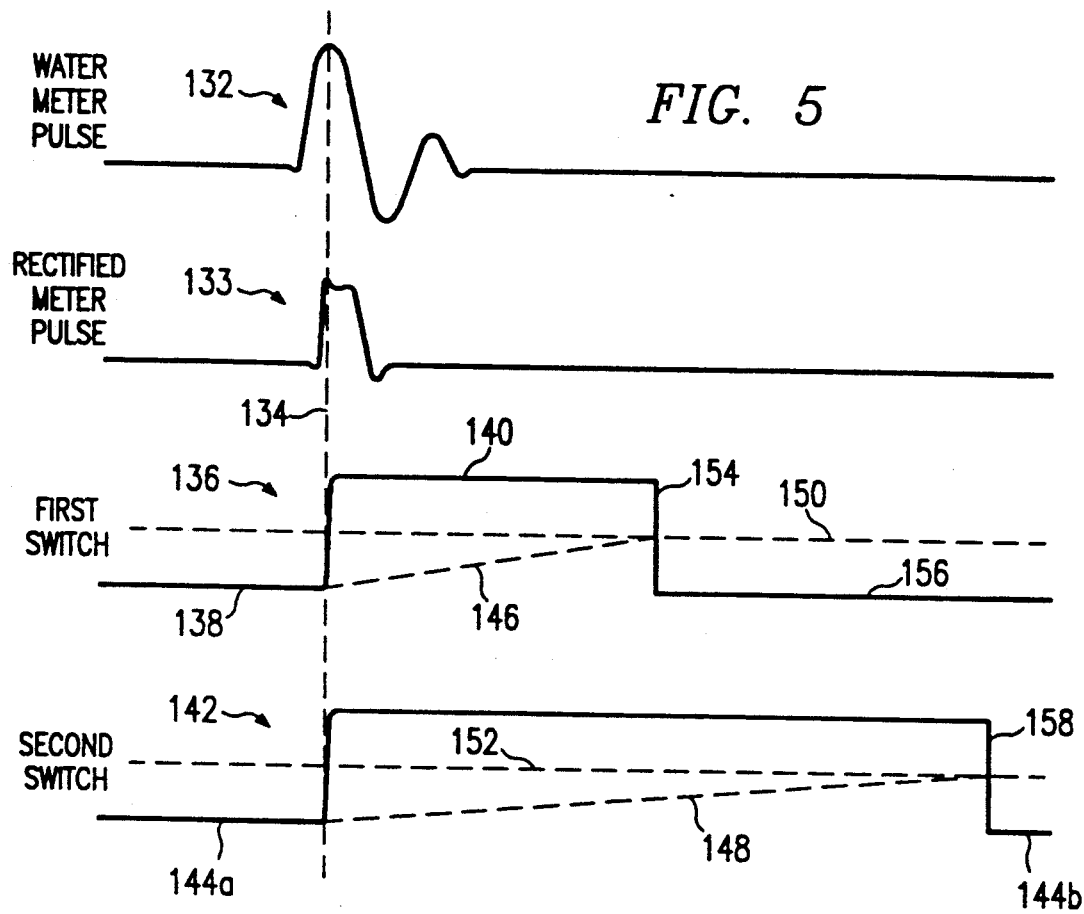
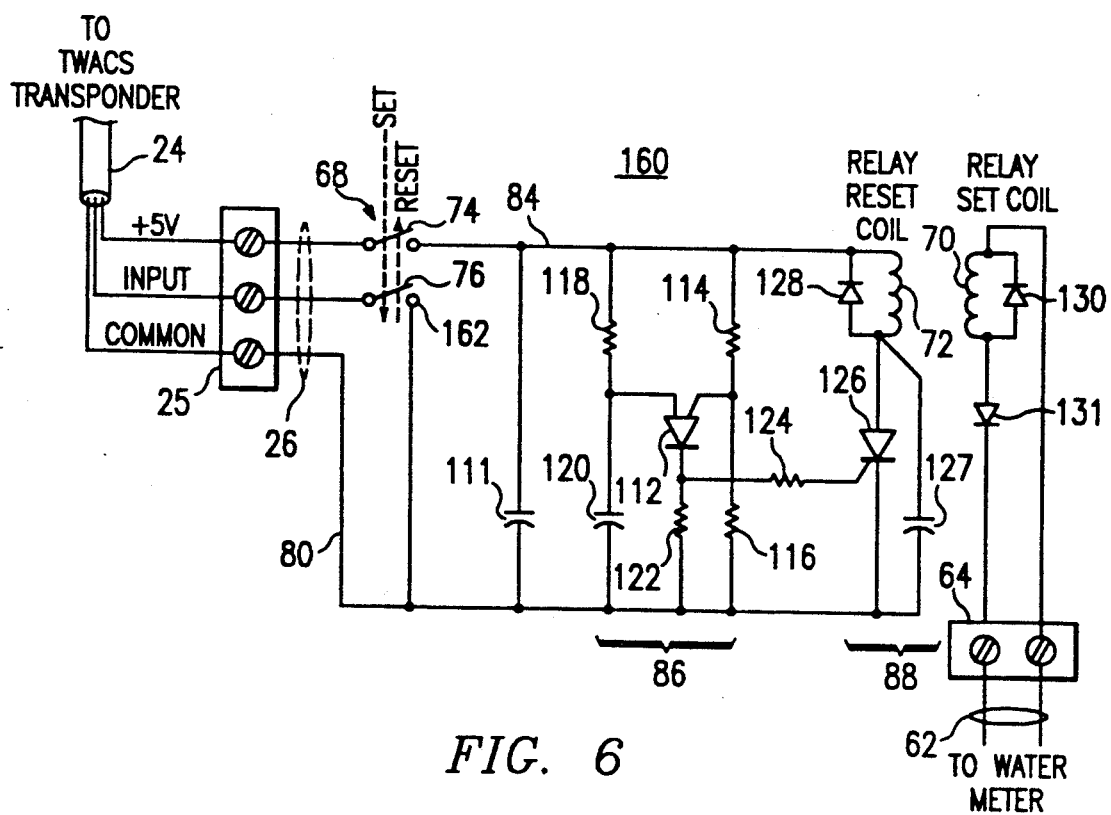

UTILITY METER INTERFACE CIRCUIT

TECHNICAL FIELD OF THE INVENTION

The present invention relates in general to utility meter apparatus which is remotely accessible to obtain utility usage data, and more particularly relates to an interface circuit for allowing data from a utility meter, nonutility equipment, or other associated equipment, to be input into another meter storage circuit which is accessible from a remote location.

BACKGROUND OF THE INVENTION

The past practice of employing personnel to travel a route to visually read utility meters has in some instances been discontinued, in favor of techniques which allow for remotely reading the usage data of different types of utility services. For example, one common practice for obtaining the water usage of a residential or business is to employ a special water meter device which stores the number of gallons used, and to connect such device to a telephone line. In this manner, the telephone line can be utilized by the water utility to remotely access the storage device to determine the amount of water used.

Another example of the capability of remotely accessing utility meters involves relatively new electrical utility usage meters. Here, the extent of the use of the electricity, generally in kilowatt hours, is stored in a memory, or similar read/write device. Each such electrical meter has a unique identity so that when interrogated from a remote location, the usage data of a particular meter can be obtained. Further, the telemetry of signals between the electric meter and a remote accounting office is carried out by way of modulation of the AC power line. This technique as the advantage that no additional telephone line is required and thus the transmission medium incurs no additional cost, and the telemetry of utility usage signals does not hamper or interfere with the general distribution of AC power. Moreover, since the utility usage signals are superimposed on the AC line voltage, the utility meters can be remotely accessed at every location where there is a distribution of AC power.

Because the electric and water utilities are generally independent entities, the development of the two different types of remote meter reading techniques has developed. As a result, it is believed that without the availability of the present invention, electric utilities would remotely access the electric meters via the AC power lines to obtain readings, while the water utilities would remotely access the water meters utilizing the telephone system.

It can be appreciated that in employing either of the above-mentioned techniques, an important consideration is the reliability of the systems to properly register the correct usage of the utility. This problem can be significant in the utility field, where unless otherwise accounted for, erroneous usage indications could be registered in the meter. If an erroneous excessive accumulation is registered during a power outage or lightning strike to the lines, or other intermittent interruptions occur, then the customer is overcharged. On the other hand, if the registration of usage data in the storage memory is insufficient, the utility company is deprived of revenue.

It can be seen from the foregoing that a need exists for an improved technique for providing a central meter storage area such that the usage data of each type of utility of a residence or business can be stored in a single storage medium and made available for remote accessing. A more particular need exists for an interface adapted for use with an electric utility meter which enables the input thereto of usage data of other types of utilities. A further need exists for a technique for accessing and remotely reading electrical, water and/or other usage data from a single data base, and transmitting such information over the AC power line.

SUMMARY OF THE INVENTION

According to an important feature of the invention, there is disclosed a meter interface for receiving utility usage information from one type of utility meter, and transferring an indication thereof for storage in a different type of utility meter or apparatus. Memory storage areas in the utility meter apparatus which are now typically used for other purposes are utilized instead for storing usage data of another type of utility.

In accordance with the preferred embodiment of the invention, poorly defined inductive electrical pulses from a water meter defining volume usage are received by the meter interface of the invention and regenerated as other pulses for transferral to a storage medium within a transponder associated with a utility meter. Such embodiment additionally includes a non-volatile storage element for storing an indication of water usage for later transferral to the electric meter transponder, should a power outage render the transponder storage medium unresponsive to regenerated pulses from he interface. The interface of the invention includes first and second timer circuits, responsive to a DC supply voltage from the electric meter transponder for regenerating the water meter pulse and transferring the same to the storage medium of the transponder.

According to the particular structure and operation of the preferred embodiment of the invention, a short inductive pulse of about ten milliseconds (ms) is transmitted from the water utility meter to the meter interface to close the pair of contacts of a non-volatile magnetic latching relay. One set of contacts connects a DC supply voltage from the electric meter transponder to the timer circuits of the interface. The other contact connects the transponder input circuits to a solid state switch which is controlled to provide a delayed, regenerated pulse to the transponder for storing indications of the water usage. A first unijunction transistor timer is responsive to the switched DC supply voltage for initiating a delay before transferring a water usage pulse to the transponder input. The first timer comprises a unijunction transistor circuit which, when timed out after a short period, triggers a silicon controlled rectifier (SCR) switch, the conductive state of which pulses the transponder. Also, upon application of the DC supply voltage to the meter interface, a second unijunction transistor timer begins a longer timing cycle, after which a second SCR is triggered to reset the non-volatile magnetic latching relay to open the contacts. The supply voltage is then removed from the meter interface and the interface is placed in condition for receiving another inductive pulse from the water utility meter. When in the inactive state, the meter interface of the invention draws no power from the utility meter transponder.

In accordance with an important aspect of the invention, should the electric utility meter and associated transponder be inoperative due to a electric power failure, a water usage pulse is still effective to set the nonvolatile magnetic latching relay and store such information until AC power is restored. When power is restored, the DC supply voltage is transferred from the transponder through the closed magnetic latching relay contacts to then initiate the first and second timing cycles. The meter interface then commences operation in the normal manner to transfer a delayed and regenerated water usage pulse to the electric meter transponder storage circuit.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same components or circuits throughout the views, and in which:

FIG. 5 is a set of electrical waveforms to facilitate understanding of the circuit of FIG. 4, and FIG. 6 is an alternative embodiment of the meter interface of the invention.

DETAILED DESCRIPTION OF THE INVENTION

Figure 1:
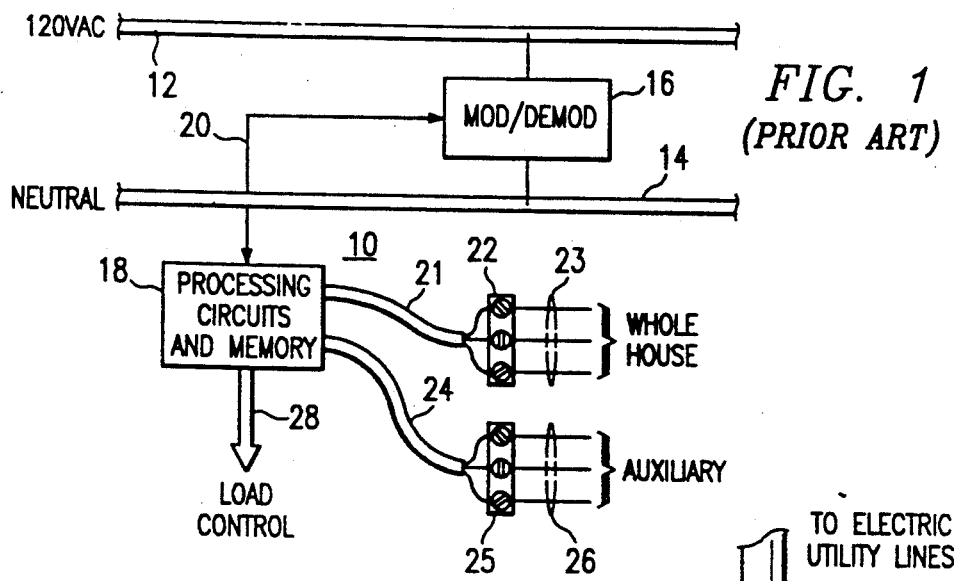
FIG. 1 is a block diagram illustrating an electric utility meter transponder for storing power usage data and load monitoring data, which data are remotely accessible via AC power lines.

FIG. 1 illustrates in basic block diagram form a utility meter transponder 10 with which the invention may be advantageously practiced. Transponders of such type are well known in the art for communicating electric utility meter readings by way of the 120 VAC power distribution system, which includes the hot wire 12 and the corresponding neutral wire 14. Among the well known transponder systems is the Two Way Automatic Communication System (TWACS ®) manufactured by Chance Load Management Systems, St. Louis, Missouri. Such a transponder is disclosed in U.S. Pat. Nos. 4,106,007 and 4,400,688. The disclosure of such patents is incorporated herein by reference thereto. Other types of similarly operating systems include the EMETCON Automated Distribution System, obtainable from ABB Power T&D Company, Inc. Raleigh, N.C. For example, the transponder 10 includes a modulator/demodulator 16 which is connected between the AC power wires 12 and 14. For the TWACS system, the modulator/demodulator 16 is effective to modulate a signal corresponding to meter usage data by pulse code modulation (PCM) techniques on the 120 VAC wire. The Emetcon system utilizes a carrier injection communication system on the AC power lines. Other power line communication systems could also be used.

The demodulator portion 16 can also receive signals from the AC power wires 12 and 14 transmitted by remote accessing equipment (not shown). Transponder 10 further includes signal processing circuits and memory 18 coupled by a bi-directional bus 20 to the modulator/demodulator 16. The transponder 10 includes a pair of ports, one, 21 is typically used for monitoring the entire electrical requirements, generally in kilowatt hours, used by the residents or business. An auxiliary port 24 of the transponder 10 can be used to optionally monitor usage requirements of individual appliances, such as water heaters, furnaces, etc. The transponder port 21 is utilized by connecting I/0 lines 23 to a connector 22. The auxiliary port 24 is utilized by connecting other I/0 lines 26 to a similar type connector 25. Electric usage from an electric meter, or the like, can be input to transponder port 21, and appropriately processed for writing a memory to store the usage data therein. Electrical pulses input to the auxiliary port 24, generated by pulsing electric meters of yet other appliances, or the like, can be stored in, the memory in like manner. Both types of usage data can be read from the memory by remote access equipment. Typically, transponders 10 of the type described have adequate memory capability to store information in the nature of total kilowatt hour readings, load survey schedules, time of use schedules, demand data, control load data and power outage information. With regard to the control load data information, the transponder 10 can be remotely accessed to control external loads, via load control output 28.

Importantly, the section of memory storing total kilowatt hour readings is divided into two areas, one is typically used for storing the whole house usage data input to transponder port 21, and the other area storing single appliance usage data, input to auxiliary port 24. According to an important feature of the invention, the connector 25, associated with the auxiliary port 24, is disconnected from the appliance and is employed to input other usage data, such as water usage or gas usage.

Figure 2:
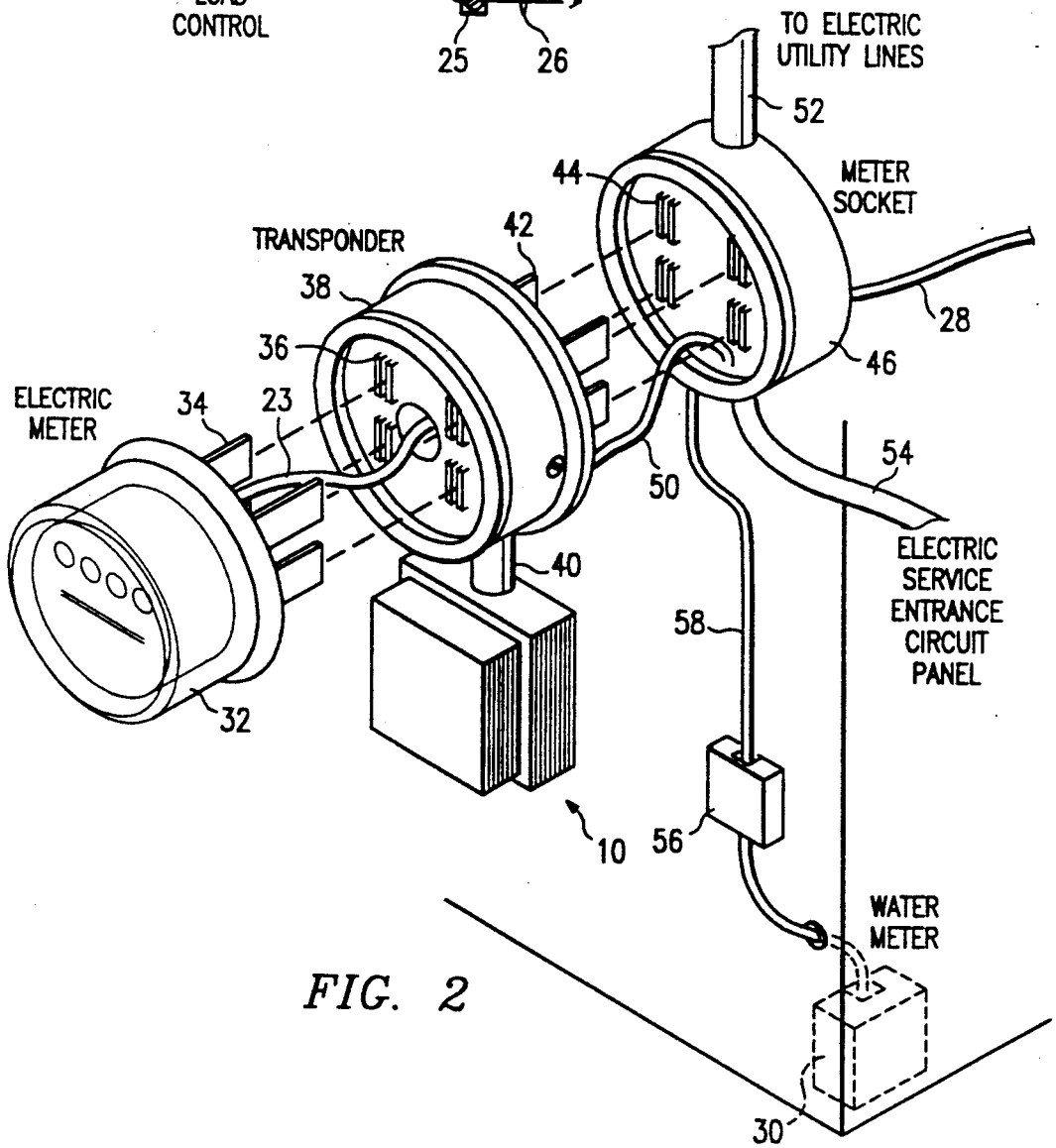
FIG. 2 is a diagram illustrating the connection of the water utility meter and associated equipment to the electric meter transponder.

With reference now to FIG. 2, there is illustrated the physical arrangement in which a water meter 30 is connected to the transponder 10 for registering water usage data in the memory thereof. It should be understood that while the following example is described in terms of providing remote accessibility to water usage data, any other electrical or nonelectrical utility or nonutility device can be utilized as a device to generate a parameter for storage in the memory of the transponder 10. According to such arrangement, an electric meter 32 includes connector tabs 34 pluggable into corresponding sockets 36 of a transponder housing 38. The transponder 10 itself is connected to the housing 38 by way of a conduit 40 which carries the various signal conductors required for operation thereof. The transponder housing 38 also includes connector tabs 42 pluggable into corresponding sockets 44 of a meter socket 46. As can be appreciated, conventional pulsing electric meters 32 are pluggable directly into the meter socket 46, but with the provision of the transponder 10 for remote access capabilities, the electric meter 32 plugs into the transponder housing 38, which housing is then pluggable into the meter socket 46. Of course, the pulsing output 23 of the electric meter 32 is connected to the connector 22 of the transponder 10. Very little on-site modification of the utility apparatus is required to provide the remote accessing capability. A cable 50 having multiple conductors carries the various signals to and from the transponder 10. The meter interface circuit of the invention, not shown in FIG. 2, is also fastened within the transponder housing 38 and connected to the transponder circuits in a manner described below.

The heavy gauge utility lines 52 are brought into the meter socket 46 from either utility pole or underground power distribution systems. The power line 52 is connected to the electric meter 32 by way of the various connectors and sockets. In addition, the transponder 10 is connected between the 120 VAC line 12 and the neutral line 14 as described in connection with FIG. 1. AC power is branched from the meter socket 46 by an AC power bus 54 to a circuit panel breaker, or the like, for further household distribution.

Rather than communicating water usage data by way of dedicated telephone lines, the water meter 30 shown in FIG. 2 is branched in parallel to both an odometer 56 to provide visual readings, as well as by conductor 58 to the meter interface circuit of the invention. The water meter conductor 58 is routed through the electric meter socket 46, and through cable 50, to the meter interface of the invention held within the transponder housing 38. The water meter odometer 56 is optional, as water usage data is registered in accordance with the method and apparatus of the invention in the memory circuits of the transponder 10. It is important to understand that conventional pulsing water meters 30, as well as pulsing gas meters (not shown) are equipped with inductive circuits which generate a pulse after a predetermined amount of usage of the particular utility. For example, some water meters produce a pulse to increment the odometer 56 after the usage of 100 gallons of water, while other meters produce such a pulse after the usage of 1000 gallons of water. The same principle is employed in gas meters after a predefined volume (cubic feet) of gas passes through the meter. According to the invention, such pulses are also routed through conductor 58 to the meter interface of the invention.

Figure 3:
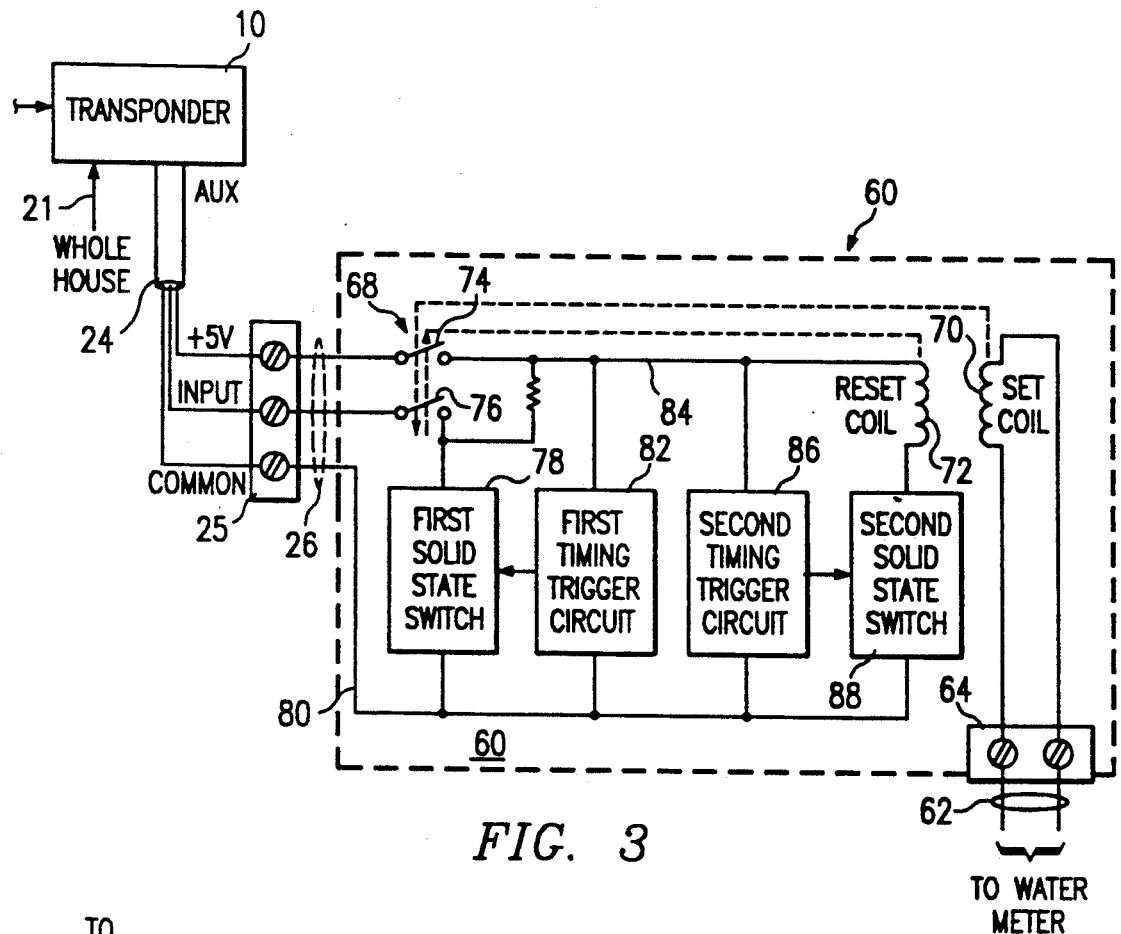
FIG. 3 illustrates a generalized block diagram of the meter interface of the invention as connected between a water meter and the electric meter transponder.

Referring now to FIG. 3, there is illustrated in generalized block diagram form the utility meter interface of the invention. The meter interface, generally designated by reference character 60, is preferably connected between the utility meter 30 and the connector 25 of the auxiliary port 24 of the transponder 10. A pair of conductors 62 from the water meter 30 are connected to a terminal block 64. A terminal block 25 provides an interconnection between the auxiliary port 24 of the transponder 10 and the meter interface 60.

The meter interface 60 includes a memory element, comprising a magnetic latching relay, having a pair of normally-open contacts 68 operated to a closed position by a relay set coil 70, and opened by the operation of a reset coil 72. The components of the relay are normally packaged together in a dual in-line package, but need not be. One relay contact 74, when closed, applies a +5 volt supply voltage from the transponder auxiliary port 24 to the meter interface 60. Another relay contact 76, when closed, connects a pulse generator, comprising a first solid state switch 78 and trigger circuit 82, to a pulse input of the auxiliary port 24 of the transponder 10. A circuit common path 80 is connected to the common conductor of the auxiliary input 26. The first solid state switch 78 is triggered by a first timing trigger circuit 82 in response to the application of the supply voltage to the bus 84. In like manner, a second timing trigger circuit 86 is responsive to the same application of the supply voltage to the bus 84 to trigger a second solid state switch 88. When the second solid state switch 88 is triggered, current flows through the delay reset coil 72, thereby opening the contacts 68. Importantly, the delay of the first timing trigger circuit 82 is less than that of the second timing trigger circuit 86. The circuits 86 and 88 can also be considered a pulse generator.

In operation, the water meter 30 provides an output inductive pulse across the conductor pair 62 after a predetermined volume of water has passed through the meter. Such a pulse drives a current through the relay set coil 70, thereby closing the latching relay contact 68. Because of the latching feature of the relay, the contacts 68 remain closed, even after the water meter pulse has ceased driving current through the relay set coil 70. When the latching relay contacts 68 are closed, a +5 volt supply voltage is applied to the first and second timing trigger circuits 82 and 86, as well as to the solid state switch 88, via the relay reset coil 72. However, the second solid state switch 88 remains nonconductive, until triggered by the second timing trigger circuit 86. In response to the application of the supply voltage to the bus 84, both trigger circuits 82 and 86 begin their respective timing cycles. The first timing trigger circuit 82 times out first, whereupon the solid state switch 78 is triggered. The solid state switch 78 holds the pulse input of the auxiliary input 26 to a low level. The low level on the auxiliary pulse input signifies to the transponder interface 25 that a unit of utility usage has occurred. In a conventional manner, the transponder processing circuits 18 process such signal for storage in the memory for subsequent accessing from a remote location. Importantly, the water usage data is stored in the transponder memory in the location previously occupied by data indicative of electrical appliance load data. In this regard, the meter interface 60 is completely transparent to the transponder 1. In other words, the transponder 10 processes the signal inputs on its auxiliary port 24 in a manner no different than the signals input as indications of single appliance load data.

Subsequent to the time out of the first timing trigger circuit 82, and after the water usage indication has been registered in the transponder memory, the second timing trigger circuit 86 completes a timing cycle. As noted above, the timing cycle of the second trigger circuit 86 is substantially longer than that of the first trigger circuit 82. When timed out, the second trigger circuit 86 triggers the second solid state switch 88, whereupon a current is drawn through the relay reset coil 72. The current through the reset coil 72 is effective to open the latching relay contacts 68 and effectively remove the meter interface 60 from the auxiliary port 24 of the transponder 10. The meter interface 60 is thus preconditioned to receive another pulse from the water meter and repeat the operational cycle. Importantly, when the meter interface 60 is not in an operational cycle, it is completely disconnected from the transponder 10 and requires no power therefrom.

In accordance with another important feature of the invention, the meter interface 60 is adapted to store an indication of a nit of utility sage, even if a power outage has occurred and the transponder 10 is not capable of registering therein such usage data. For example, in the event of a power outage, no supply voltage is available from the auxiliary port 24 to the meter interface 60. Notwithstanding, and if water should be used during the power outage, the water meter 30 will yet transmit a pulse through the relay set coil 70, and will close the latching relay contacts 68. However, because no supply voltage is coupled to the interface bus 84 in this situation, the first and second trigger circuits 82 and 86 do not begin their timing cycles. When power is restored to the AC distribution lines, and thus to the transponder 10, the supply voltage will be coupled through the previously closed relay contacts 68 to the interface bus 84. The first and second trigger circuits 82 and 86 will then begin their respective timing cycles, whereupon an operational cycle is completed, as described above.

Figure 4:
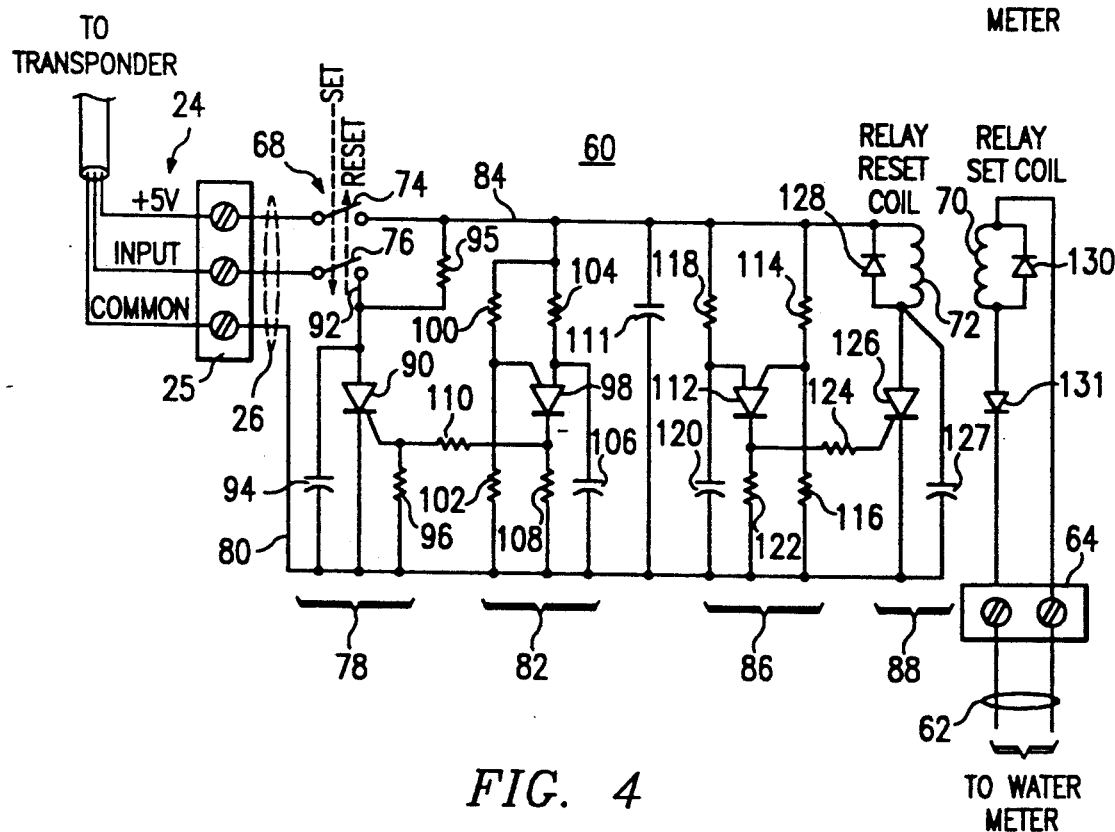
FIG. 4 is a detailed electrical schematic drawing of the meter interface according to the preferred form of the invention;.

Having described the basic operation of the meter interface 60 of the invention, reference is now made to FIG. 4 where a detailed electrical schematic drawing is shown. The first solid state switch 78 comprises a silicon controlled rectifier (SCR) 90 having its anode connected to a pole 92 associated with the latching relay contact 76. The cathode of the SCR 90 is connected to the meter interface common bus 80. Resistor 95 provides adequate current to the SCR 90. A bypass capacitor 94 is connected across the anode and cathode of the SCR 90 to prevent false triggering of the device due to quick changing voltage transitions. A resistor 96 connected between the gate of the SCR 90 and the circuit common 80 increases the sensitivity of the device.

The first timing trigger circuit 82 includes a programmable unijunction transistor (PUT) 98. The gate of the PUT 98 is connected to the junction of two resistors 100 and 102 which comprise a voltage divider between the supply voltage bus 84 and the common bus 80. The value of the resistors 100 and 102 is chosen such that the trigger voltage applied to the gate of the PUT 98 is about two thirds the magnitude of voltage applied to the bus 84. The anode of the PUT 98 is connected to the junction of a resistor 104 and a timing capacitor 106. The value of the resistor 104 and the capacitor 106 is chosen such that as the capacitor 106 charges, the voltage applied to the anode of the PUT 98 equals or slightly exceeds the reference voltage on the gate after a predefined period of time. In the preferred embodiment of the invention, the reference voltage applied to the gate of the PUT 98 is about 2.5-4 volts, and the time constant in which the capacitor 106 charges to the same voltage value is about 100 milliseconds. Such time period applies to the TWACS system, while different time constants may be required for other transponder systems. Accordingly, when a supply voltage is connected to the supply bus 84, the PUT 98 will become conductive a delay period of about 100 milliseconds thereafter. The cathode of the PUT 98 is connected through a resistor 108 to the circuit common 80. The resistor 108 is selected in value so as to limit the current flowing from the PUT 98 to the circuit common 80. Another resistor 110 is connected between the cathode of the PUT 98 and the gate of the SCR 90. Resistor 110 also limits the trigger current supplied by the PUT 98 to the gate of the SCR 90.

A filter capacitor 111 is connected between the supply voltage bus 84 and the circuit common 80 to suppress transients, such as those caused by contact bounce, or other transients coupled from the transponder 10 to the meter interface 60 by way of the conductors connected to the terminal block 25.

The second timing trigger circuit 86 is similar to the first trigger circuit 82, with the exception of various circuit values which are effective to increase the timing cycle. The second timing circuit 86 includes a programmable unijunction transistor 112 having a gate connected between a resistor divider comprising resistors 114 and 116. The anode of the PUT 112 is connected to the junction of an RC network, comprising a resistor 118 and timing capacitor 120. In the preferred embodiment of the invention, the values of the resistor 118 and the capacitor 120 are chosen such that a timing cycle, or delay, of about 200-300 milliseconds is realized, again for the TWACS system. Connected to the cathode of the PUT 112 is a resistor 122 connected to the circuit common 80, as well as a resistor 124 connected to the gate of an SCR 126. After the second timing trigger circuit 86 completes its timing cycle, the PUT 112 is triggered, thereby generating a current coupled to the gate of the SCR 126, thereby triggering the second solid state switch 88.

The second solid state switch 88 includes the SCR 126 with a cathode terminal connected to the circuit common 80, and an anode terminal connected to one end of the latching relay reset coil 72. The other end of the reset coil 72 is connected to the supply voltage bus 84. A diode 128 is connected in a reverse-biased manner across the reset coil 72 to reduce inductive voltage spikes. A capacitor 127 is connected across the anode and cathode of the SCR 126 to reduce false triggering of the device. The relay set coil 70 has a diode 130 bridged across it for similar purposes.

In accordance with an important feature of the invention, a silicon diode 131 is connected in series with the relay set coil 70 to provide half-wave rectification of signals carried by the conductor pair 62. Although the series diode 131 does prevent the full water meter pulse voltage from being developed across the set coil 70, the rectification action thereof has been found to be beneficial, in that reverse currents through the coil 70 are prevented. In other words, the signal generated by the water meter 30 frequently has positive and negative polarity excursions due to ringing and transients. While the positive excursions through the set coil 70 are of sufficient duration and magnitude to close the relay contacts 68, the negative excursions can sometimes be of a sufficient magnitude to reverse the current through the coil 70 and cause the contacts to again open. Hence, the series diode 131 allows current to flow through the set coil 70 in only a single direction to prevent inadvertent release of the contacts 68.

Having identified and described the functional characteristics of the various components of the meter interface 60, the detailed operation will be described below in conjunction with the waveforms of FIG. 5. The water meter pulse 132 is representative of the signal generated by conventional water or gas meters to trigger odometers and similar devices. Such a pulse 132 is also utilized to set into operation the meter interface 60 so that a regenerated pulse can be registered in the memory circuit of the transponder 10. The water meter pulse 132 is generated by inductive techniques in the water meter, and thus is not a waveform having well defined rising and falling edges, but rather is accompanied by ringing, as noted above. A rectified water meter pulse is shown as numeral 133. Because of the low energy level of the rectified water meter pulse 133, a magnetic latching relay should be selected so that at least the set coil thereof is energized sufficiently such that the contacts 68 close and remain closed. Preferably, a relay should be selected having a set coil characteristic such that the contacts are reliably operated and latched in response to a pulse having a ten millisecond duration and a magnitude higher than about 3.5 volts. In the preferred form of the invention, magnetic latching relays of the type well adapted for use in the invention include the type identified by 327-21E200, obtainable from Midtex Relays, Inc., El Paso, Texas. Of course, other magnetic latching relays may be readily available and suitable for use with the invention. Importantly, the magnetic latching relay employed in the meter interface 60 is of the type having independent set and reset coils. Again, other magnetic latching relays may be suitable for use with the invention, and being of the type having a single coil which is set by a current flowing therethrough in one direction, and reset by a current flowing therethrough in the other direction.

In any event, after a prescribed volume of water has passed through the water meter 30, a pulse 132 is generated and applied to the meter interface terminal block 64, via the conductor pairs 62. The rectified pulse 133 drives a current through the relay set coil 70 and through the diode 131, thereby causing the contacts 68 to become latched in a closed position. It is to be noted that the relay contacts 68 illustrated in FIG. 4 are shown in an open position, such as when the meter interface 60 is in a quiescent state. Once the magnetic latching relay contacts 68 are closed, the +5 volt supply voltage is applied from the transponder 10 to the supply voltage bus 84. Such time period is shown as the broken vertical line 134 in FIG. 5. The waveform 136 depicts the voltage across the SCR 90 before, during and after the operational cycle of the meter interface 60. The part of the waveform illustrated as reference number 138 is actually an open circuit voltage, illustrating the voltage across the SCR 90 before the switch contacts 76 have closed. That part of the waveform identified as 140 illustrates the time period in which the SCR 90 connected to the transponder auxiliary terminal block 25 through contact 76 is pulled up to a voltage of about +5 volts. Such a voltage is supplied through a resistance by the transponder 10, through the "input" conductor, but is then pulled low when the SCR 90 is driven into a conductive state. The waveform 142 illustrates the waveform generally across the SCR 126 which comprises the second solid state switch 88. Again, a waveform portions 144a and 144b are open circuit voltages, as during such time no supply voltage is applied to the meter interface 60.

Once the supply voltage is applied to the meter interface 60, both the first trigger circuit 82 and the second trigger circuit 86 begin their respective timing cycles, i.e., capacitor 106 begins charging, as does timing capacitor 120. The charging cycle of capacitor 106, associated with the first trigger circuit 82 charges according to the curve 146, while the charging curve of timing capacitor 120 is shown as reference numeral 148. The threshold of the first timing circuit 82, as established by resistors 100 and 102, is shown by the horizontal dotted line 150. The threshold of the second timing circuit 86, as established by resistors 114 and 116, is shown by horizontal dotted line 152. When the charge across timing capacitor 106 is substantially equal to the trigger point 150, the PUT 98 is driven into a conductive state and supplies current to the gate terminal of the SCR 90, comprising the first solid state switch 78. The SCR 90 is then driven into a conductive state to drive the transponder input terminal to a low voltage, as shown by waveform transition 154. The water meter pulse is thus effectively regenerated as a longer duration low level, as noted by numeral 156. As noted above, the transponder 10 is responsive to such an input to thereby register in the memory corresponding usage data for water consumption. The duration of the low voltage level 156 is not critical, but may depend on the type of the transponder utilized. In the TWACS transponder noted above, such duration 156 is about 100-200 milliseconds to insure reliable operation, although it could be less.

The initial high voltage portion 140 of the waveform 136 is also about 100 milliseconds, as defined by the value of resistor 104 and capacitor 106. Such time period is selected as a delay period between the water meter pulse input and the regenerated low voltage applied to the transponder auxiliary port 24. The generation of such a time period is important especially during the recovery of a power outage, when the transponder circuits are recovering and initializing to predefined states. The delay shown by waveform portion 140 allows the transponder circuits to "warm up" and be completely responsive after a power outage recovery so that no information will be lost between the meter interface 60 and the transponder 10. Such time period applies to the TWACS system, while different time constants may be required for other transponder systems.

The entire timing cycle of the second trigger circuit 86 is selected such that the first trigger switch 78 is operated for a time sufficient for registration of the utility usage in the transponder memory, and thereafter the second timer 86 times out to activate the second solid state switch 88. As noted above, the entire timing cycle of the second trigger switch is set at a nominal 200-300 milliseconds for the TWACS system. The activation of the second solid state switch 88 is noted by transition 158. As can be seen, when the voltage across the timing capacitor 120, shown as broken line 148, reaches the threshold set point voltage 152, within a margin of a semiconductor junction threshold, the PUT 112 is driven into a conductive state. When conductive, the PUT 112 drives the gate terminal of the SCR 126 and it drives it into conduction as well. When driven into a conductive state, the SCR 126 draws supply voltage current through the relay reset coil 72, thereby causing the latching relay contact 68 to open. The interface circuit 60 is then preconditioned to receive further indications of utility usage from the water meter to carry out another operational cycle.

While the principles and concepts of the invention can be carried out utilizing different circuit configurations and components, it is believed that the circuit of FIG. 4 has advantageous characteristics. For example, the magnetic latching relay can be latched to hold a state, irrespective of the powered, or unpowered state of the transponder. The latching relay is highly immune to inadvertent operation caused by transients and electromagnetic interference (EMI). This is an important aspect, insofar as circuits in the vicinity of power lines can be subjected to high EMI voltages. The relay contacts additionally provide a high degree of electrical isolation between the transponder 10 and the meter interface 60. With a high degree of isolation, irregular pulses generated by the water meter lines will not be carried through to the transponder 10. Those skilled in the art may find that an optical coupled switch can be substituted for the contact 76. Unlike solid state memory of flip-flop circuits, the relay is immune to false triggering, in that it has a higher threshold voltage and a slower response time. In addition, unlike solid state circuits, the relay is not easily damaged by high speed and high power transients, and indeed the relay may not even be operated when exposed to such transients, as contrast with counterpart semiconductor storage circuits. An important aspect of the use of a latching relay in the meter interface 60 is that it can be operated without an external DC supply voltage. Another technical advantage of the invention is that the solid state devices utilized in the meter interface 60 are of the type which are rugged and highly immune to damage because of electrical transient voltages. The programmable unijunction transistors are also highly reliable and provide a high degree of repeatability of time periods, if the RC components have adequate temperature and life characteristics. The first and second trigger circuits 82 and 86 provide time periods generally independent of internal PUT device characteristics, but rather depend on the external capacitor and resistor characteristics which can be chosen with a high degree of selection and care. When considering the delay or time periods employed with the present invention, the generation of such periods by the trigger circuits are generally insensitive to supply voltage variations.

The invention has been described above in terms of the transponder being associated with the electric meter for communication over the AC power transmission line. Such an arrangement is not necessary to carry out the principles and concepts of the invention. Indeed, a transponder can be associated with a water meter and used with the interface of the invention to input thereto gas or electric usage data for transmission over the telephone. Other arrangements are possible.

In accordance with yet another embodiment of the invention, there is disclosed in FIG. 6 another meter interface 160. In this embodiment, no transponder warm-up time delay is provided, but rather a regenerated utility usage signal is immediately applied to the transponder 10. The meter interface 160 of FIG. 6 is essentially the same as that of FIG. 4, with the exception of the absence of the first solid state switch 78 and the first timing circuit 82. Rather, the magnetic latching relay contact 76 is switchable to a pole 162 which is connected to the circuit common 80.

In operation, when the water meter pulses the relay set coil 70, the contacts 68 latch in a closed condition. Power from the transponder 10 is applied to the second timing circuit 86 which commences its timing interval. The RC components 118 and 120 in this circuit may be chosen to achieve a timing cycle of about 100 milliseconds. After such timing cycle, the SCR 126 is triggered and the relay contacts 68 are opened. The regenerated pulse input to the transponder auxiliary port 24 is still about 100 milliseconds in duration for the TWACS system, but is not preceded by the delay identified by curve portion 140 in FIG. 5.

The components of the meter interfaces 60 or 160 can be assembled on a small printed circuit board and encapsulated within a polycarbonate enclosure. The conductors of the interface circuit can extend from the encapsulant through an opening in the polycarbonate enclosure and be connected to the appropriate terminal blocks.

From the foregoing, disclosed are methods and apparatus adapted for storing multiple types of utility usage data in another type of utility meter storage area. An advantage of such type of technique is that no modifications need be made to the transponder itself in order to store water, gas or other types of utility usage data in the storage area. When the transponder is accessed from a remote location to retrieve the usage data, the usage data input via the meter interface can be interpreted as such, rather than appliance load data normally stored in such location. When such data is collected from a number of meters, a file in the nature of magnetic tapes or disks can be transferred to the appropriate utility for billing the customers for the utility usage. In this manner, and in the example given above, the water utility companies need not concern themselves with reading the meters or maintenance or the rental of telephone lines, but rather need only process the accounting records to bill the customers appropriately.

Those skilled in the art may readily appreciate from the foregoing that the invention and the apparatus described above can be expanded to accommodate additional transponder ports for the simultaneous input of water usage data, gas usage data, etc. In other words, transponders may be devised with a number of ports and corresponding storage areas in the memory so that many different types of usage data can be stored therein and retrieved remotely by way of the AC power lines. Each such transponder port may be equipped with a meter interface of the invention to process the magnetic output of the respective utility meters and to regenerate appropriate input to the transponder for storage in the appropriate memory locations.

While the preferred and other embodiments of the invention have been disclosed with reference to specific meter interfaces and methods, it is to be understood that changes in detail may be made as a matter of engineering choices without departing from the spirit and scope of the invention, as defined by the appended claims.

What is claimed is:

1. An interface for coupling utility usage signals to a remotely readable transponder, comprising:
    said interface being connected to the transponder for receiving DC power from the transponder to power circuits of the interface;
    a bistable storage element for storing an indication of at least one utility usage signal, said bistable storage element being capable of registering said indication of said utility usage signal in the absence of said DC power;
    a pulse generator responsive to said DC power form the transponder and responsive to the state of the bistable storage element for transferring usage information from said bistable storage element to the transponder; and
    a reset circuit for resetting said bistable storage element after said signal transferral.

2. A method for coupling utility usage information to a remotely readable transponder, comprising the steps of:
    pulsing an interface circuit with a utility usage signal;
    storing in said interface circuit an indication of the usage signal by latching a storage element in a first state in response to the utility usage signal;
    in response to the application of a DC supply voltage from the transponder, transferring a usage data signal thereto;
    resetting the storage element after transferring the usage data to the transponder; and
    controlling a switch with said storage element to connect the supply voltage to the interface circuit during one state of the storage element, and to disconnect the supply voltage from the interface during the other state of the storage element.

3. An interface for coupling utility usage signals to a remotely transponder, comprising:
    said interface being connected to the transponder for receiving DC power from the transponder to power circuits of the interface;
    a magnetic latching relay for storing an indication of at least one utility usage signal in a nonvolatile manner, said magnetic latching relay being capable of loading therein said indication of said utility usage signal in the absence of said DC power;

a transfer circuit responsive to said DC power from the transponder for transferring usage information from said magnetic latching relay to the transponder; and a reset circuit for resetting said magnetic latching relay after said signal transferral.

4. The interface circuit of claim 3, wherein said transfer circuit comprises a pulse generator responsive to power from the transponder and responsive to the state of said bistable storage element for transferring the usage information to the transponder.

5. The interface circuit of claim 4, wherein said pulse generator comprises a monostable multivibrator responsive to the usage information stored in said bistable.

6. The interface circuit of claim 3, wherein said reset circuit comprises a pulse generator responsive to power form the transponder for generating a signal to reset said bistable storage element.

7. The interface circuit of claim 6, wherein said magnetic latching relay includes one coil energized in response to said utility usage signal and another coil energized by said reset circuit.

8. The interface circuit of claim 3, further including a switch for connecting the supply voltage to the interface circuit during operation thereof, and disconnecting the supply voltage after transferring the usage information to the transponder.

9. An interface circuit for coupling utility usage information to a remotely readable transponder, comprising:

a latching relay for receiving a utility usage pulse and for loading therein an indication thereof in the absence of a DC supply voltage applied to said latching relay; and a circuit responsive to a signal comprising a DC voltage form the transponder for transferring the utility usage indication thereto.

10. The interface circuit of claim 9, further including in combination a remotely readable transponder.

11. The interface circuit of claim 9, further including a pulse generator coupled to said latching switch and responsive to the transponder signal for pulsing the transponder if said bistable element is in a predefined state.

12. The interface circuit of claim 9, further including a conductor connecting a utility meter to said bistable element for pulsing said bistable element with an inductive utility meter pulse.

13. The interface circuit of claim 9, wherein the transponder is associated with an electric utility meter, and the usage information is derived form water usage.

14. A method for coupling utility usage information to a remotely readable transponder, comprising the steps of:

setting a magnetic latching relay to store an indication of utility usage;

closing a connection between the transponder and the interface circuit to supply a voltage to the interface;

signalling the transponder with utility usage data after a predetermined delay period after setting of said relay; and resetting the relay to remove the supply voltage from the interface circuit.

15. The method of claim 14, further including resetting the relay a predetermined period of time after signalling the transponder with the usage data.

16. The method of claim 14, further including pulsing said magnetic latching relay with an inductive-generated pulse from a utility meter.

17. The method of claim 16, further including half-wave rectifying the inductive-generated pulse.

18. The method of claim 14, further including setting the magnetic latching relay before a supply voltage is connected to the interface.

19. An interface circuit adapted for carrying out the steps of claim 14 and storing an indication of the utility usage data in a nonvolatile manner.

20. An interface for coupling utility usage signals to a remotely readable transponder, comprising:

a magnetic latching having one winding for receiving a pulse generated by a utility meter, said magnetic latching relay being set in response to the utility meter pulse, said magnetic latching relay including a second winding and switchable contacts;

a circuit connected tot he transponder and to said magnetic latching relay contacts for transferring an indication of utility usage to the transponder; and a circuit connected to said second winding of said magnetic latching relay for resetting thereof subsequent to transferral of the indication of utility usage.

21. The interface of claim 20, further including a set of contacts operable with said one winding for coupling a voltage from the transponder to said interface.

22. The interface of claim 20, further including a rectifier for half-wave rectification of the utility meter pulse.

* * * * *